(No Model.) 2 Sheets—Sheet 1.
S. E. MOWER & G. E. HAIGHT.
TORPEDO.
No. 498,183. Patented May 23, 1893.
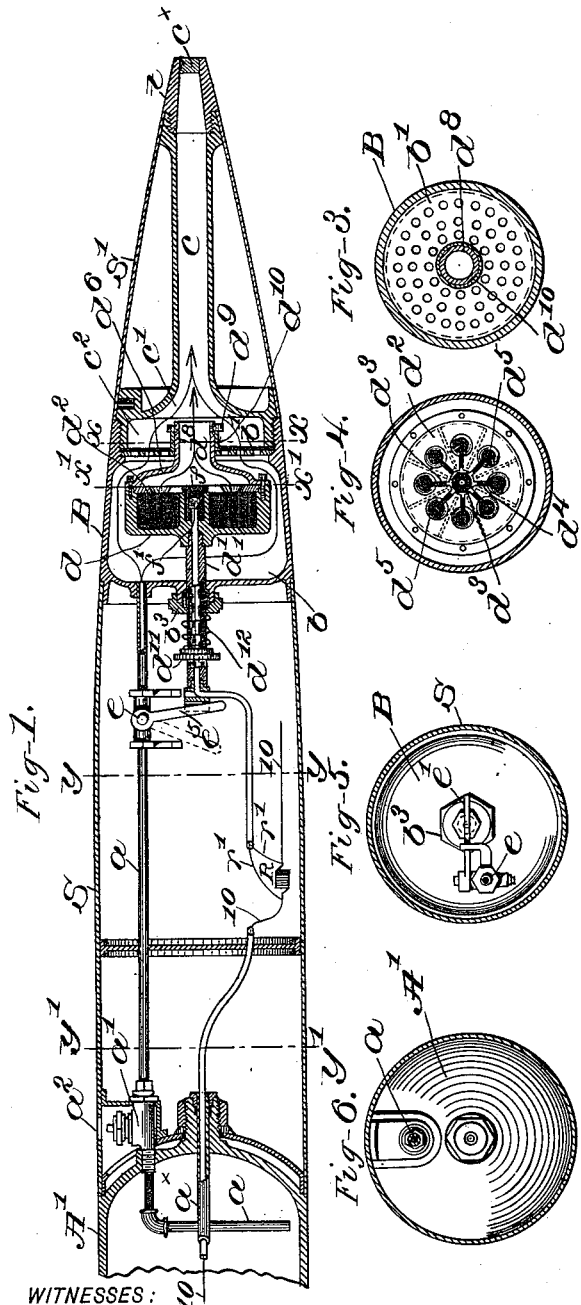
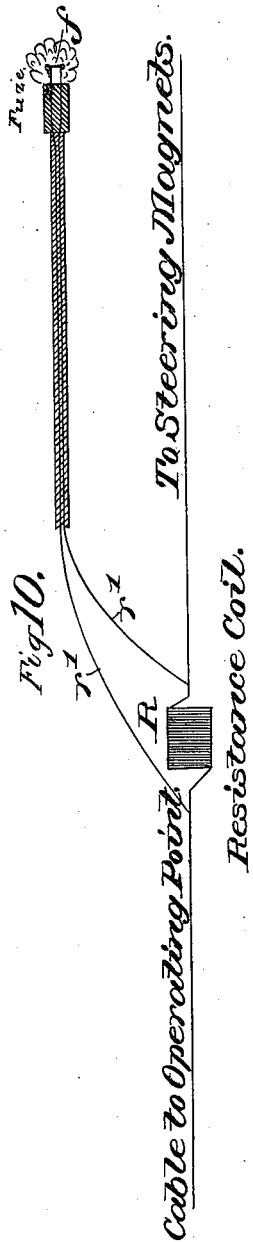
WITNESSES:
Louis N. Dowell
Edward G. Allen
INVENTORS
Samuel E. Mower
George E. Haight
BY Crosby & Gregory
ATTORNEYS.

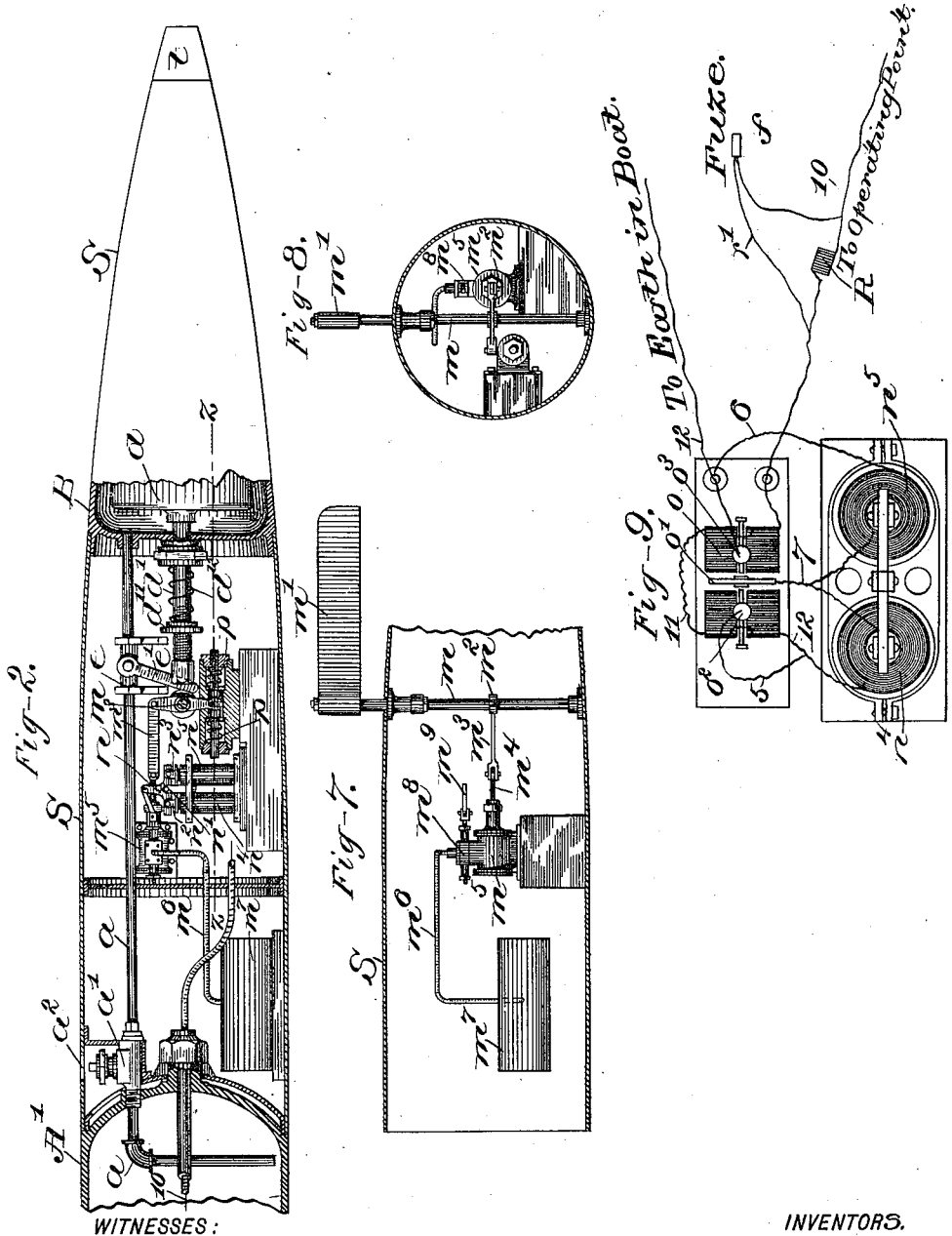

UNITED STATES PATENT OFFICE.

SAMUEL E. MOWER AND GEORGE E. HAIGHT, OF NEW HAVEN, CONNECTICUT, ASSIGNORS TO HENRY G. THOMPSON & SON, OF SAME PLACE.

TORPEDO.

SPECIFICATION forming part of Letters Patent No. 498,163, dated May 23, 1893.

Application filed July 5, 1892. Serial No. 438,996. (No model.)

*To all whom it may concern:*

Be it known that we, SAMUEL E. MOWER and GEORGE E. HAIGHT, of New Haven, county of New Haven, State of Connecticut, have invented an Improvement in Torpedoes, of which the following description, in connection with the accompanying drawings, is a specification, like letters and figures on the drawings representing like parts.

This invention has for its object to provide a torpedo capable of propelling itself at a high rate of speed for a predetermined distance, the speed being regulated to overtake moving vessels, and to penetrate any usual form of net which may be spread to protect the vessel.

In accordance with this invention, we employ a power or propelling medium which may be air or gas, preferably previously compressed in a suitable flask or receptacle carried by the torpedo, the expansive force of the compressed power medium being yet further increased by a heating surface heated by the combustion of a substance capable of supporting its own combustion, that is, capable of burning within the torpedo without the presence of air or oxygen supplied from an exterior source. The substance used being simply to heat and increase the expansive force of the power medium, may be easily carried in sufficient quantity to maintain the requisite heat for such length of time as to propel the torpedo at a high rate of speed for any practical distance, and this without materially increasing the weight or size of the torpedo.

One part of this invention therefore, consists in an auto-mobile torpedo containing a flask to receive a power medium and having an apartment or chamber for the reception of a substance capable of supporting its own combustion to heat said power medium to increase its power as will be hereinafter described.

Other features of this invention will be hereinafter described and pointed out in the claims.

Figure 1, represents in horizontal longitudinal section, a sufficient portion of a torpedo containing our improvement to enable our invention to be understood; Fig. 2, a similar view of the same parts in another position, together with one form of steering mechanism. Figs. 3, 4, 5 and 6, are sectional views taken respectively on the dotted lines $x-x$, $x'-x'$, $y-y$, $y'-y'$ Fig. 1, Figs. 3, 4 and 6, looking to the left; Fig. 5, looking to the right; Fig. 7, a partial vertical section on the dotted line $z-z$ Fig. 2; Fig. 8, a right-hand end view of Fig. 7; Fig. 9, a view showing the steering magnets and their circuit connections; Fig. 10, a diagram view to be described.

Referring to the drawings, A represents a sufficient portion of the rear end of a torpedo to enable this invention to be understood, the forward end thereof being similarly or otherwise suitably formed to properly penetrate the water and contain a chamber adapted for the reception of a coil of electric cable by which the movements and operation of the torpedo may be controlled from the operating point, and also to contain the explosive substance which is adapted to be fired or exploded in usual or desired manner upon reaching the object to be destroyed.

The torpedo is carried by or suspended from some usual float, not shown, which serves to maintain the torpedo at a distance of from three to four feet below the surface of the water and out of reach of hostile guns, the said float being of such material that it will not be injured by penetration of a shot or projectile and sunk.

Referring to Figs. 1 and 2, the torpedo has a composite construction, that is, it has a middle portion made as a closed flask A', one end or half only of which is shown, the half not shown being closed in like manner, another essential portion of the torpedo being a casting B having formed within it a heating chamber $b$, said flask and casting B being connected by a shell S, the casting B being also connected with the tip $t$ by the tapering shell S'. The flask A' receives the power fluid or medium which preferably is compressed into a liquid form, the said fluid being conducted by a pipe $a$, from near the bottom of the flask to the heating chamber $b$, said pipe having a valve $a'$ accessible from the exterior of the shell through an opening $a^2$ therein. The heating chamber $b$ at its rear end communicates through the perforated plate or distributer $b'$ with the combining chamber $c^2$ formed at the inner flaring end $c'$ of the jet tube $c$, the latter being shown as extended back to the tip $t$ and forming a continuation of the opening therein.

The heating chamber $b$ contains the movable cup-shaped or hollow heater $d$ herein represented as carried on the end of a sliding tubular shaft $d'$ extended forward through a suitable stuffing box $b^3$ in the front wall of the heating chamber and co-operating with and operating the actuating lever $e'$ of a valve $e$ in the pipe $a'$, longitudinal movement of the shaft effecting the movement of the valve.

The heater $d$, closed by a cover $d^2$, is preferably subdivided into a number of small compartments as indicated in dotted lines Fig. 4, each of which contains a quantity of a substance capable of burning and supporting its own combustion; such for instance, as a compound of nitrate of potash, powdered carbon, and glycerine. A central recess $d^3$ in the heater contains also a quantity of ignitible substance which is connected by radiating fuses $d^4$ with the substance contained in the said compartments, said fuses entering the compartments through suitable openings $d^5$ in the cover $d^2$. The igniting substance contained in the central recess $d^3$ has embedded in it a detonator or fuse $f$ connected with the cable, by means of which the substance in said recess may be ignited to spread by means of the fuses $d^4$ to the compound in the several compartments of the heater. The heating substance being thus distributed in several independent compartments of the heater, when ignited, burns uniformly and provides a uniform heat on all sides.

A hood $d^6$ attached to the rear of the heater $d$ terminates in a neck $d^8$ which extends back through the perforated plate $b'$ into the combining chamber $c^2$, the said neck at its rear end having a collar $d^9$, between which and the said perforated plate is interposed a ring $d^{10}$ of easily fusible material, as solder, and the tubular shaft $d'$ at or near its front end has a collar $d^{11}$, between which and the front wall of the heating chamber $b$ is interposed a spiral spring $d^{12}$, the tendency of which is to move the shaft $d'$ and heater $d$ forward or to the left from their rearmost positions Fig. 1, into their positions Fig. 2, said movement being, however, normally resisted by the fusible ring $d^{10}$.

The operation of the various parts is as follows:—After opening the valve $a'$, the torpedo will be placed in the water with its parts in the positions represented in Fig. 1, the rear end of the jet tube $c$ being stopped by a plug $c^x$. If now the detonator or fuse $f$ in the middle recess of the heater then be exploded or ignited, as will be hereinafter described, the substance in the said recess will be ignited and will communicate through the various fuses to the several compartments of the heater and simultaneously ignite the heating substance in the said compartments, all of which will immediately begin to burn, the products of combustion being gathered in by the hood $d^6$ and passed out through the neck $d^8$ into the combining chamber $c^2$ and jet tube $c$. When the pressure caused by such combustion has been raised to a certain predetermined degree, the plug $c^x$, stopping the end of the jet tube, will be blown out, the pressure within the tube due to the burning of the heating substance being thereafter sufficient to prevent the water from entering the tube.

When the temperature within the heating chamber has been raised to the degree necessary to properly expand the power gas, the fusible ring $d^{10}$ will melt and permit the spring $d^{12}$ surrounding the tubular shaft $d'$ to move the shaft and heater forward or to the left Fig. 1, into their positions Fig. 2, such movement of the shaft acting upon the lever $e'$ of the valve $e$, and moving the latter as shown in Fig. 2 to open the pipe $a$, and permit the power medium contained within the flask $A'$ to enter the heating chamber $b$. The medium thus entering the heating chamber comes in contact with the heater on all sides its temperature is quickly raised to a high degree, and its expansive power correspondingly increased, the said gas thence expanding through the distributing plate $b'$ into the combining chamber $c^2$, there combining with the products of combustion issuing through the neck of the hood $d^6$, the combined products expanding with great force out through the jet tube $c$ and acting in the form of a jet against the water in which the torpedo is placed, to propel the torpedo forward at a high rate of speed.

The temperature within the heating chamber is maintained at a constant high degree so long as the heating substance within the heater lasts, and the quantity of this heating substance may be such as to maintain the required degree of temperature for any desired length of time without materially increasing the weight carried, and it therefore follows that the boat may be propelled practically for any desired distance limited only by the capacity of the flask containing the power-gas, which flask, however, can easily carry sufficient gas to propel the torpedo for almost any distance, by compressing the gas into the flask.

The torpedo may be steered in any desired manner. We prefer, however, a steering mechanism substantially as shown in the drawings, wherein the post $m$ carrying the rudder $m'$ has an arm $m^2$, one end of which is connected by a link $m^3$ with the piston rod $m^4$ of a piston in a steering cylinder $m^5$, which piston is moved in one or another direction preferably by a low tension gas conducted to the cylinder through a pipe $m^6$ from a reservoir $m^7$.

The movements of the piston within the cylinder are controlled by a suitable valve contained within the valve chest $m^8$ and actuated by a link $m^9$ connected with a T-shaped lever n, pivoted at n', see Fig. 2, and carrying the two armatures $n^2$, $n^3$ of the solenoids $n^4$, $n^5$, the passage of current through which is controlled by a polarized relay to be described.

Referring to Fig. 9, the armature o' of the polarized relay o moves between the two fixed contacts $o^2$, $o^3$, which are connected respectively by wires 5, 6, with the solenoids $n^4$, $n^5$, said solenoids being joined by a common wire 7, to the said armature. The cable leads from the operative point, and contains the wire 10 which is connected with one pair of magnets of the polarized relay, as shown in Fig. 9, the two pairs of magnets being connected by a wire 11, the second pair being connected by wire 12 with the wire 5 as shown. The wire is grounded at the operative point, and also by wire 12 is connected with the metal of the torpedo, thence through the water to the ground, so that a normally open ground circuit is established. A resistance R is included in the line 10 at some point within the torpedo, the detonator or fuse f for igniting the heating substance in the heater being arranged in a shunt r' around this resistance, Figs. 9 and 10, said shunt reaching the fuse in the heater through the hollow shaft d', as represented in Fig. 1.

In starting the torpedo, a current of electricity sent through the wire 10 in the cable will pass through the shunt around the resistance R and will blow out the fuse f and thereby ignite the heating substance in the heater as described, to set the torpedo in motion. Thereafter if a current of one polarity, as for instance, + be sent over the wire 10, and through the resistance R, said current will cause the armature o' of the polarized relay to be moved to the left into engagement with the fixed contact $o^2$, thereby causing the current to pass through and energize the solenoid $n^4$, thence through the wire 12 to the ground, completing the circuit. The solenoid $n^4$ being thus energized will attract its armature n', Fig. 2, and will move the valve of the steering cylinder to the left to admit pressure from the reservoir $m^7$ to the right of the piston in said cylinder and move the rudder in a direction to divert the torpedo to the right. If, however, a current of opposite polarity, as − be sent over the wire 10, said current will cause the armature of the polarized relay to be moved to the right Fig. 9, into engagement with the fixed contact $o^3$, thereby closing the circuit through the solenoid $n^5$, energizing the latter and causing it to attract its armature $n^3$ to move the valve of the steering cylinder to the right and admit pressure from the reservoir $m^7$ to the left of the piston in said cylinder, to move the rudder in the opposite direction to divert the torpedo to the left. Thus a current of one polarity moves the rudder in one direction, and a current of opposite polarity moves the rudder in an opposite direction, while the rudder, when the circuit is broken, remains in a central position, it being centered by the springs p, Fig. 2, acting at opposite sides upon the end of the arm $n^2$ opposite that to which the link $n^3$ is connected.

The resistance R in the steering wire causes the first electric impulse to pass through the shunt and blow out the fuse to start the torpedo, after which the current passes through the resistance direct, and is utilized for steering purposes, the said wire therefore having a double function, one to fire the fuse and start the torpedo, and the other to steer the torpedo after it has been started. The cable containing the wire is conducted from the chamber in front of the flask A' which contains the coil of cable back to the fuse and steering mechanism behind the said flask, through a pipe $a^x$ which extends longitudinally through the flask A', as clearly shown in Figs. 1 and 2.

Nitrous oxide gas constitutes a good power medium, as the same has great expansive power which is increased to a very high degree by an increase of temperature, and the said gas may be readily compressed into a liquid form in the flask A' making it convenient to carry. This invention is not, however, limited to the use of said gas for the power medium, and instead, any other gas, as for instance, carbonic acid, anhydrous ammonia, or even compressed air may be used to advantage.

While we have herein mentioned as a heating substance a compound of nitrate of potash, powdered carbon, and glycerine, yet the invention is not limited in this respect, as any other substance or compound which is capable of supporting its own combustion, that is, which is capable of burning without air or oxygen supplied from an exterior or artificial source, may be used and yet be within the scope of this invention.

The greatest advantage of the torpedo herein described and embodying our invention, lies in the fact that its speed remains undiminished from the time it is started until the time when the heating substance is exhausted, and inasmuch as the heating substance is used only for heating purposes and not for propelling purposes, it is not rapidly exhausted and therefore may be carried conveniently in such quantity as to maintain the required heat to raise the temperature of the power gas, for practically any length of time sufficient to propel the torpedo for any predetermined distance, making it possible to operate the torpedo at a safe distance from the hostile vessel or to pursue such vessel in its flight for the desired distance.

While we have herein shown and described our torpedo as propelled by means of a jet, it is obvious that the power fluid may be utilized to drive an engine or motor of suitable construction to propel the torpedo by means of a screw or other device, the gist of this invention consisting in the raising of the temperature of a power medium by means of heat generated by the combustion of a heating substance capable of supporting its own combustion.

Heretofore in torpedoes of this class it has been common to actuate the steering mechanism by the high tension power fluid, it being necessary to conduct the same first through a reducing valve to reduce it to such a tension that it may be easily used in steering the torpedo. In our invention, however, we employ as described, two independent fluids, one a high tension contained within the flask A' to propel the torpedo, and the other a low tension contained within the reservoir $m^7$ to actuate the steering mechanism. Expensive and troublesome reducing valves are thus rendered unnecessary in this invention.

This invention is not limited to the particular construction of the various parts shown and described, as the same may be obviously varied in many particulars within the skill and judgment of a mechanic and yet be within the scope of our invention.

We claim—

1. A torpedo having a flask or chamber to contain a power fluid, and an apartment for a heating substance capable of supporting its own combustion as described and adapted to furnish heat to the power fluid and raise the temperature of the same to thereby increase its expansive power, substantially as described.

2. In a torpedo, a flask containing a power fluid, combined with a heating chamber to raise the temperature of the power fluid when passed therethrough and a heater in said heating chamber, said heater containing a heating substance capable of supporting its own combustion, substantially as described.

3. In a torpedo, a flask or chamber for a power fluid, a heating surface for and to raise the temperature of the power fluid when the latter is drawn from the flask, and a device controlled by the temperature of said heating surface to control the passage of the power fluid from the flask to said heating surface, substantially as described.

4. A torpedo, containing the following instrumentalities, viz:—a flask to contain the power fluid, a heating surface, a conduit to conduct the fluid thereto to be heated, a valve in and normally closing said conduit, a spring actuated shaft to open the said valve, and a fusible ring to restrain movement of the shaft and adapted to be melted by the heat from the heating surface to permit movement of the shaft to open the valve, substantially as described.

5. In a torpedo, the combination with a flask or chamber for a power fluid, of a heating substance for the same capable of supporting its own combustion to raise the temperature of the power fluid, and a combining chamber in which the power fluid and the products of combustion from the heating substance are combined, substantially as described.

6. In a torpedo, a flask to contain the power fluid, and a heating chamber into which the fluid is conducted to be heated, combined with a heater located in said chamber and having a series of compartments each containing a heating substance capable of supporting its own combustion, substantially as described.

7. In a torpedo, a heating chamber, having a power fluid supplied to it at one end and having a perforated distributing plate at the opposite end through which said fluid escapes, combined with a heater arranged within said heating chamber and containing a heating substance capable of supporting its own combustion, substantially as described.

8. In a torpedo, the combination of the following instrumentalities, viz:—a heating chamber having a power fluid supply therefor at one end and a perforated distributing plate at the opposite end through which said fluid escapes; a heater arranged within said chamber, and containing a heating substance capable of supporting its own combustion; a hood for said heater having a neck extending through said perforated plate; and a jet tube to collect the said fluid and the products of combustion from the said heating substance and to direct the same rearward, substantially as described.

9. In a torpedo, the combination with a power fluid flask or chamber, and a jet-tube through which the fluid in the flask escapes from the torpedo, of a heating substance, capable of supporting its own combustion to raise the temperature of the said fluid before it escapes from said tube, substantially as described.

10. In a torpedo, the combination of the following instrumentalities, viz:—a flask to contain a power fluid; the heating chamber $b$, in which to heat the gas from the flask, its perforated wall $b'$, the jet-tube $c$ having a flaring end $c'$, and the heater $d$, constructed and operating substantially as described and containing a heating substance capable of supporting its own combustion, substantially as described.

11. In a torpedo, the combination with a flask or chamber for a power fluid; of a heater for the power fluid, said heater containing a series of compartments each of which receives a quantity of heating substance capable of supporting its own combustion; and a common recess containing an igniting substance connected with the several compartments by fuses whereby a uniform combustion is obtained, substantially as described.

12. A torpedo containing the following instrumentalities, viz:— an electrically-controlled steering mechanism, a controlling wire therefor connecting the said mechanism with the operative point and containing a resistance, and a fuse arranged in a shunt around said resistance to start the torpedo, in the manner substantially as described.

13. In a torpedo, a flask to contain a substantially high tension power fluid means whereby said fluid is employed to propel the torpedo, combined with a steering mechanism, and a reservoir containing a low tension fluid to actuate the said steering mechanism, substantially as described.

In testimony whereof we have signed our names to this specification in the presence of two subscribing witnesses.

SAMUEL E. MOWER.
GEORGE E. HAIGHT.

Witnesses:
HENRY G. THOMPSON,
L. H. DAYTON.